(12) United States Patent
Toma et al.

(10) Patent No.: US 7,346,483 B2
(45) Date of Patent: Mar. 18, 2008

(54) DYNAMIC FIFO FOR SIMULATION

(75) Inventors: Horia Toma, Mountain View, CA (US); Thorsten Heiner Groetker, Aachen (DE); Srinivas Bongoni, Irvine, CA (US); Andrea Kroll, Milpitas, CA (US)

(73) Assignee: Synopsys, Inc., Mountain View, CA (US)

( * ) Notice: Subject to any disclaimer, the term of this patent is extended or adjusted under 35 U.S.C. 154(b) by 691 days.

(21) Appl. No.: 10/683,923

(22) Filed: Oct. 10, 2003

(65) Prior Publication Data

US 2005/0080610 A1    Apr. 14, 2005

(51) Int. Cl.
G06F 17/50 (2006.01)
G06F 9/45 (2006.01)

(52) U.S. Cl. .................... 703/15; 703/19; 703/22; 716/1

(58) Field of Classification Search ............. 703/15, 703/19, 22; 716/1
See application file for complete search history.

(56) References Cited

U.S. PATENT DOCUMENTS

| | | | |
|---|---|---|---|
| 5,410,652 A * | 4/1995 | Leach et al. ............... | 370/450 |
| 6,115,760 A | 9/2000 | Lo et al. | |
| 6,128,678 A | 10/2000 | Masteller | |
| 6,233,540 B1 * | 5/2001 | Schaumont et al. ........ | 703/14 |
| 6,442,646 B1 | 8/2002 | Tsuruta | |
| 6,513,105 B1 | 1/2003 | Pontius | |
| 6,526,495 B1 * | 2/2003 | Sevalia et al. ............. | 711/173 |
| 6,606,588 B1 * | 8/2003 | Schaumont et al. ........ | 703/15 |
| 6,820,219 B1 * | 11/2004 | Huang et al. .............. | 714/25 |

OTHER PUBLICATIONS

Maurice Herlihy, Victor Luchangco, Paul Martin, Mark Moir, "Dynamic-sized Lockfree Data Structures" Sun Microsystems, Jun. 2002, pp. 1-18.*

Clifford E. Cummings, Peter Alfke "Simulation and Synthesis Techniques for Asynchronous FIFO Design with Asynchronous Pointer Comparisons" SNUG-2002 San Jose Ca. pp. 1-18.*

* cited by examiner

*Primary Examiner*—Paul Rodriguez
*Assistant Examiner*—Dwin McTaggart Craig
(74) *Attorney, Agent, or Firm*—Bever, Hoffman & Harms, LLP; Jeanette S. Harms (57) ABSTRACT

To perform a simulation, a design can be divided into "blocks" described by models. To ensure that data is efficiently transferred from an source model to a destination model, a dynamic first-in first-out (FIFO) can be placed between these models. The initial size of the dynamic FIFO can be set to a relatively small value. To prevent deadlock, the size of the FIFO can be automatically increased in size by increments. In this manner, the memory resources of the FIFO can be tightly controlled. Advantageously, the size of the optimized dynamic FIFO can be used as the desired size of the FIFO implemented in silicon, thereby also ensuring efficient use of silicon resources.

46 Claims, 6 Drawing Sheets

Figure 1A

```
                                           110 read(val_) {
    while (NUM_READABLE == 0) wait (1);   // (111)
    buf_read(val_);                        // (112)
    NUM_READABLE--;                        // (113)
    NUM_FREE ++;                           // (114)
}
write(const val_) {
    while (NUM_FREE == 0) wait(1);         // (115)
    buf_write( val_ );                     // (116)
    NUM_READABLE++;                        // (117)
    NUM_FREE--;                            // (118)
}
```

```
read(val_) {                                                    209
    while (NUM_READABLE == 0) wait(1);    // (210)
    buf_read(val_);                       // (211)
    NUM_READABLE--;                       // (212)
    NUM_FREE ++;                          // (213)
}
write(const val_) {
    if ( NUM_FREE == 0 ) {                // (214)
        int tmp = WAITPERIOD;             // (215)
            while ((NUM_FREE == 0) && (tmp--))  // (216)
                wait(WAITUNIT);           // (217)
            if(tmp == 0) && (NUM_FREE ==0) {    // (218)
                SIZE += SIZEINCREMENT;    // (219)
                if (SIZE > SIZEMAX) exit();     // (220)
                buf_resize(SIZEINCREMENT);     // (221)
            }
    }
    buf_write( val_ );        // (222)
    NUM_READABLE++;           // (223)
    NUM_FREE--;               // (224)
}
```

```
write(const val_) {
  while (NUM_FREE == 0) {                    // (310)
    int tmp = WAITPERIOD;                    // (311)
    while ((NUM_FREE == 0) && (tmp--))       // (312)
      wait(WAITUNIT);                        // (313)
    if(tmp == 0) && (NUM_FREE ==0){          // (314)
      if(m_incr_size) {                      // (315)
        SIZE += SIZEINCREMENT;               // (316)
        if(SIZE > SIZEMAX) exit();           // (317)
        buf_resize(SIZEINCREMENT);           // (318)
      } else {                               // (319)
        WAITPERIOD += p_WAITINCREMENT;       // (320)
        if(WAITPERIOD > WAITMAX) exit();     // (321)
      }
      m_incr_size = !m_incr_size;            // (322)
    }
  } buf_write( val_ );                         // (323)
  NUM_READABLE++;                            // (324)
  NUM_FREE--;                                // (325)
}
```

DYNAMIC FIFO FOR SIMULATION

BACKGROUND OF THE INVENTION

1. Field of the Invention

The present invention relates to a first-in first-out buffer (FIFO) used as an interface between simulation models, and in particular to a dynamic FIFO that facilitates fast simulation and an appropriately-sized implementation in hardware and/or software.

2. Description of the Related Art

Performing one or more simulations allows a user to determine whether a design functions correctly in a software environment before implementing the design in a combination of software and silicon. To perform a simulation, a user can divide the design into "blocks", called models herein that model the behavior of individual components or subsystems.

Generally, running models during simulation at a higher level of abstraction is faster than running models at a lower level of abstraction. These levels of abstraction are called execution domains herein. For example, a system level execution domain can provide a high-level description of a block. In contrast, a register transfer level (RTL) execution domain can provide an intermediate-level description of the block. A gate level execution domain can provide a very detailed description of the block.

As designs increase in size and complexity, simulations of these designs become slower. To address this problem, a user may use models of different execution domains to describe the blocks of the design. For example, for the design of a cell phone in a wireless communication system, the hardware of the cell phone may be simulated at the RTL or gate level. Of importance, simulating the cell phone's ability to transmit and receive messages from a station may require simulating some portions of the station, but not at the same level required for the cell phone itself. Thus, the station that facilitates communication with the cell phone may only need to be simulated at the system level. Because the station is described at the system level, rather than the RTL or gate level, the simulation time to test the cell phone design can be significantly reduced.

Of importance, different execution domains can have different timing variables. For example, both the RTL as well as the gate level execution domains are timed. That is, the RTL and gate level execution domains include delays, e.g. instructions to wait for a given amount of time or the occurrence of an event. However, a system level execution domain may be timed or un-timed.

Un-timed models, which include algorithmic or data flow and control graphs, are frequently used for blocks of the design that have mathematical properties, but no timing considerations. For example, design blocks such as integer accumulators or adders could be simulated using un-timed models. An integer accumulator functions by adding to its accumulating output, which is initialized to zero. Specifically, as long as its input is "1", the output of the accumulator would generate "0, 1, 2, 3" and so forth. An adder functions by adding its inputs to generate an output. Thus, if a two-input adder received the output of the accumulator as its two inputs, the adder would generate "0, 2, 4, 6" and so forth.

The values of interest in a model, which could be inputs and/or outputs, are called "tokens". In a simulation, tokens are "generated" and "consumed" by the models. To ensure that tokens are not "lost" when they are generated and then transferred between models, these tokens must be saved in memory for consumption by a destination model. This memory not only saves the generated tokens, but must also maintain their order of receipt. In many simulators, a first-in first-out buffer (FIFO) can be used to save the sequence of generated tokens. A FIFO creates a queue wherein the oldest token received is the next output token. The size of the FIFO needed between two models instances depends on the number of generated tokens and the number of consumed tokens per model activation. Note that the number of tokens produced and/or consumed can vary from activation to activation.

In a prior art simulation, a user must manually determine the appropriate size of the FIFO. In simple designs, such as the exemplary design described above (i.e. the integer accumulator and adder), the user can easily determine the appropriate size. Unfortunately, standard integrated circuit designs are much more complicated than this exemplary design and manual re-sizing becomes very expensive if not logistically impossible.

Specifically, for the simulation to run accurately, i.e. without deadlock and at optimal speed, the user must properly size the FIFO used as an interface between the models. To determine the proper sizing, the user must consider the number of tokens generated by the source model as well as the number of tokens that can be consumed by the destination model.

Figure 1A:
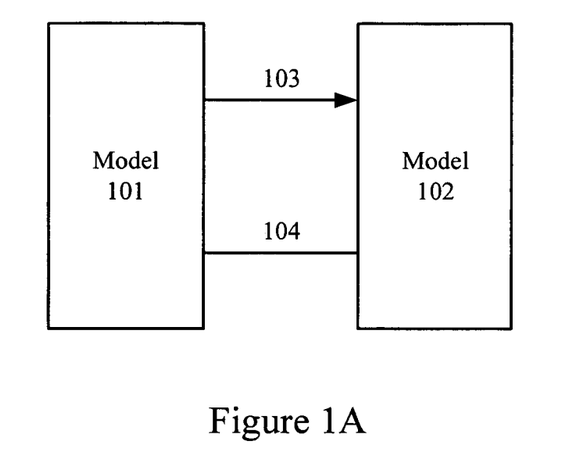
FIG. 1A illustrates a simplified representation of prior art FIFOs that can be used as interfaces between two models.

FIG. 1A illustrates two models 101 and 102 that represent independently scheduled threads of execution in a simulation system. Each of models 101 and 102 may be timed, un-timed, or clocked (i.e. behavior initiated or resumed based on a clock signal). During a simulation, models 101 and 102 can exchange data using ports, interfaces, or function calls.

Of importance, models 101 and 102 are, either directly or indirectly, connected through fixed-size FIFOs. To avoid loss of data, models 101 and 102 access the FIFOs in a "blocking" way. Specifically, an attempt to read from an empty FIFO will block until there is data available in the FIFO. Likewise, an attempt to write into a full FIFO will block until there is space available in the FIFO.

In the embodiment shown in FIG. 1A, model 101 writes to a FIFO 103, which is then read by model 102 (indicated by the arrow pointing from model 101 to model 102). In FIG. 1A, FIFO 104 can facilitate model 102 writing and model 101 reading, or vice versa. Unfortunately, as now described, using fixed size FIFOs can result in an undesirable state called deadlock.

For example, assume that model 101 writes to and model 102 reads FIFO 104. Further assume that no tokens are stored in FIFO 104 and FIFO 103 is full. Under these conditions, model 102 is blocked if it attempts to read from FIFO 104. Moreover, model 101 is blocked if it attempts to write to FIFO 103. In another example, assume that model 102 writes to and model 101 reads FIFO 104. Further assume that both FIFOs 103 and 104 are full. Under these conditions, model 101 is blocked if it attempts to write to FIFO 103. Similarly, model 102 is blocked trying to write to FIFO 104. Thus, a system including fixed size FIFOs can be easily deadlocked.

To solve this problem, the user can manually re-size the FIFO to make it sufficiently large to ensure that deadlock does not occur. For example, in the system of FIG. 1A including models 101 and 102, FIFOs 103 and 104 could be re-sized to be large enough so that deadlock is avoided. This manual re-sizing can be done after simulation (e.g. after a simulation failure, a deadlocked state, or a time-out condition) or before simulation.

Re-sizing FIFOs after simulation implies that time has already been lost with at least one additional simulation and the necessary analysis. Manual resizing before the simulation requires a through knowledge of the entire design, which is very tedious and time consuming even in relatively simple designs. Typical designs used in simulation include hundreds of models with hundreds or even thousands of connections. In this case, manual re-sizing of each FIFO can become logistically impossible.

Figure 1B:
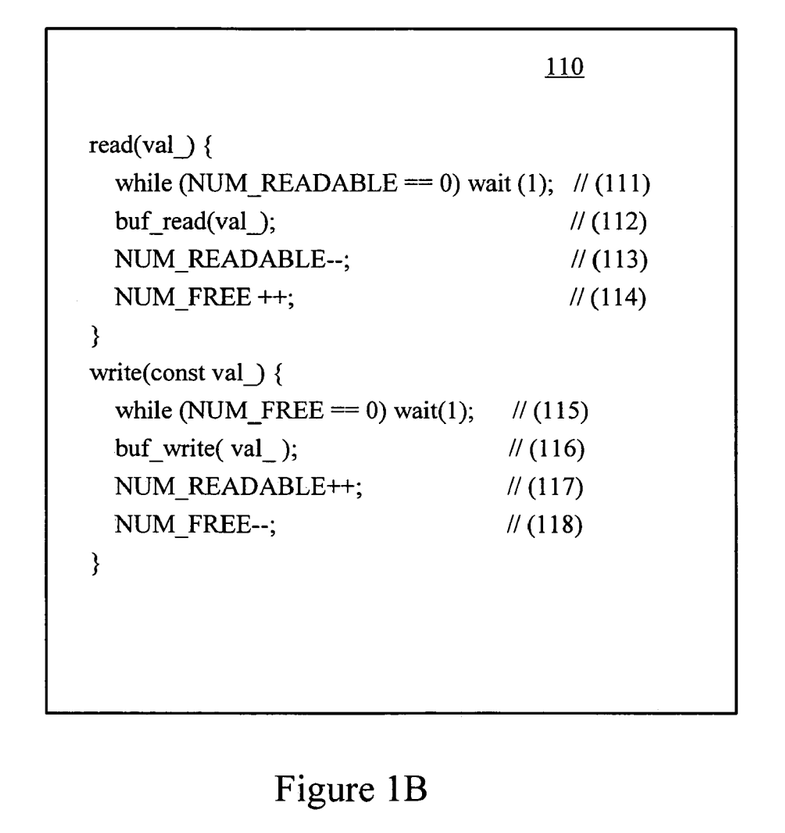
FIG. 1B illustrates pseudo code that describes the operation of one FIFO shown in FIG. 1A. Note that FIG. 1B depicts only one possible implementation of a fixed-size FIFO. Of importance, choosing a different implementation will not eliminate the problems related to using fixed-sized FIFOs.

Moreover, the already difficult task of re-sizing FIFOs can be further complicated by design parameters associated with the FIFOs as well as the source/destination models. For example, FIG. 1B illustrates pseudo code 110 for FIFO 103. Referring to pseudo code 110, in a read function, code 111 waits until a token is available in storage. When the token becomes available, code 112 delivers the token to the reader and code 113 and 114 adjust the variables that count the number of available tokens (which is decremented by 1) and free spaces (which is incremented by 1). In a write function, code 115 waits until a space is available to write a new token. When the space becomes available, code 116 writes the token and code 117 and 118 adjust the variables that count the number of available tokens (which is incremented by 1) and free spaces (which is decremented by 1).

Assume that FIFO 103 has a size of 1 (i.e. FIFO 103 can hold a single token), model 101 is un-timed, and model 102 is a timed model that must wait 500 time units to read a token (which would be provided in pseudo code for model 102, not shown). Using these design parameters, model 101 can write a first token to FIFO 103, but is blocked attempting to write a second token because FIFO 103 is full. After 500 time units, model 102 can read the first token, but is blocked to read another token because FIFO 103 is empty. A simulation scheduler can activate model 101, which in turn can write another token before it becomes blocked again. Similarly, the simulation scheduler can activate model 102, which can read another token before it becomes blocked again. Thus, a simulation scheduler will have to perform an average of two block activations to process and move a single token from model 101 to model 102. The overhead associated with this pattern of blocking and activation can significantly increase execution time, which is highly undesirable. Increasing the size of FIFO 103 to hold, for example, 1000 tokens would reduce the number of scheduler invocations and process activations by three orders of magnitude, thereby significantly improving simulation speed.

Thus, as demonstrated above, estimating an appropriate size for FIFO 103 can be made quite complex even by introducing only two simple design parameters for FIFO 103 and model 102. In a standard design, such design parameters can include complex expressions or may even be computed at runtime based on values of the tokens received. Therefore, it may not be practical or even possible to compute optimum FIFO size before simulation.

Therefore, to solve this problem, some users resort to over-sizing all FIFOs before simulation. Unfortunately, this over-sizing introduces a heavy penalty when the design is implemented. That is, implementing large FIFOs in either silicon or software consumes expensive resources and significantly slows design speed. For example, over-sizing FIFOs adversely affects subsequent simulation operations. Specifically, the memory requirements of these over-sized FIFOs may exhaust workstation resources, thereby deteriorating simulation speed due to cache effects. Moreover, large FIFOs implemented in hardware do waste silicon resources.

Therefore, a need arises for a FIFO having an optimal size to reduce simulation time and silicon resources, but large enough to minimize the possibility of deadlock.

SUMMARY OF THE INVENTION

Users typically perform a simulation to determine whether a design functions correctly in a software environment before implementing the design in silicon. To perform a simulation, the design can be divided into "blocks" described by models. To ensure that data, also called tokens, transferred from a source model to a destination model are not lost, a memory device can be placed between these models. For accurate simulation results, this memory device should store the tokens in the order of receipt. A standard memory device that can perform this function is a first-in first-out buffer (FIFO).

The size of the FIFO can be based on the number of tokens generated by the source model and the number of tokens consumed by the destination model. Manual sizing of the FIFO can be tedious and/or computationally difficult, thereby undesirably increasing simulation time and the possibility of error.

In accordance with one feature of the invention, a dynamic FIFO can be used to minimize the possibility of deadlock, increase simulation speed, and decrease verification time. Deadlock can occur when the FIFO is full and the destination model is not requesting a token. In this state, simulation of the source model must be suspended> Otherwise, tokens from the source model may be lost.

The dynamic FIFO can receive the tokens generated by a first model, store the tokens, and provide the tokens in an order output by the first model when requested by a second model. In accordance with one feature of the invention, a wait period of the dynamic FIFO can be set, wherein the wait period is defined by a predetermined number of time units of a timed simulation kernel. The wait period can be decreased each time the dynamic FIFO is full and the second model does not request a token. If the wait period is reduced to zero, then the size of the dynamic FIFO can be automatically increased by an increment. Advantageously, by using a relatively small initial size and incremental size increases, the memory resources of the dynamic FIFO can be tightly controlled.

In one embodiment, the dynamic FIFO can include a counter, wherein a counter value can be increased each time the size of the dynamic FIFO increases. If the counter value exceeds a limit, then the predetermined number of time units defining the wait period can be automatically increased. Increasing the size of the dynamic FIFO and the predetermined number of cycles defining the wait period can be performed alternately or using another schedule.

This embodiment can be particularly useful when the execution speed of the dynamic FIFO varies considerably from that of the destination model. Specifically, this dynamic FIFO can automatically allocate memory as well as adapt its timing behavior to the execution speed of the destination model. In this manner, the dynamic FIFO can efficiently balance size with simulation speed.

Advantageously, after simulation using either embodiment, the size of the optimized dynamic FIFO can be used as the desired size of the FIFO implemented in silicon. Therefore, the dynamic FIFO also efficiently uses silicon resources.

In accordance with one feature of the invention, a dynamic memory used for simulation can include means for receiving tokens from a first model, means for storing the tokens for consumption by the second model, and means for providing the tokens in an order output by the first model when requested by the second model. The dynamic memory can further include means for setting a wait period, wherein the wait period is defined by a predetermined number of time units of a timed simulation kernel.

Each time the dynamic memory is full and the second model does not request a token, the dynamic memory device can decrease the wait period. If the wait period is reduced to zero, then the size of the means for storing the tokens can be increased by an increment. In one embodiment, the dynamic memory can alternately increase its size and the predetermined number of time units defining the wait period.

In one embodiment, after one or more simulations using a dynamic FIFO, subsequent simulations of the design can use a standard (i.e. fixed size) FIFO. Of importance, the size of the standard FIFO can be determined by the optimized size of the dynamic FIFO. Because a simulation using a fixed size FIFO can be performed more quickly than a simulation using the dynamic FIFO, replacing the dynamic FIFO with the standard FIFO can advantageously further reduce simulation time. At the end of simulation, the dynamic FIFO will report all the data collected during simulation, such as the maximum size and maximum wait period. These numbers may be used to design a fixed size FIFO that can be used for implementation.

DETAILED DESCRIPTION OF THE FIGURES

Simulations can be performed to determine whether a design functions correctly in a software environment before implementing the design in silicon. To perform a simulation, a design can be divided into "blocks" described by models. A first-in first-out buffer (FIFO) can be used to ensure that data, i.e. tokens, transferred from one model to another model, are not lost.

A FIFO can be sized based on the number of tokens generated by a source model and the number of tokens consumed by a destination model. Accurate sizing of a FIFO can be computationally intensive, thereby undesirably increasing simulation time and the possibility of error.

To solve this problem, users can conservatively estimate the size of the FIFO. However, in this case, a FIFO is typically over-sized to minimize the possibility that deadlock occurs, e.g. the FIFO is full and the destination model is not requesting a token, thereby preventing continued simulation of the source model. An over-sized FIFO can result in longer simulation time and, when implemented in silicon or software, waste valuable resources.

In accordance with one feature of the invention, a dynamic FIFO can be used during simulation to minimize the possibility of blockage. In one embodiment, the initial size of the dynamic FIFO can be set to a relatively small value. If blockage does occur, then the size of the FIFO can be automatically increased in size. In one embodiment, the size can be increased by increments. In this manner, the memory resources of the FIFO can be tightly controlled. Advantageously, after simulation, the size of the optimized dynamic FIFO can be used as the desired size of the FIFO implemented in silicon.

Figure 2A:
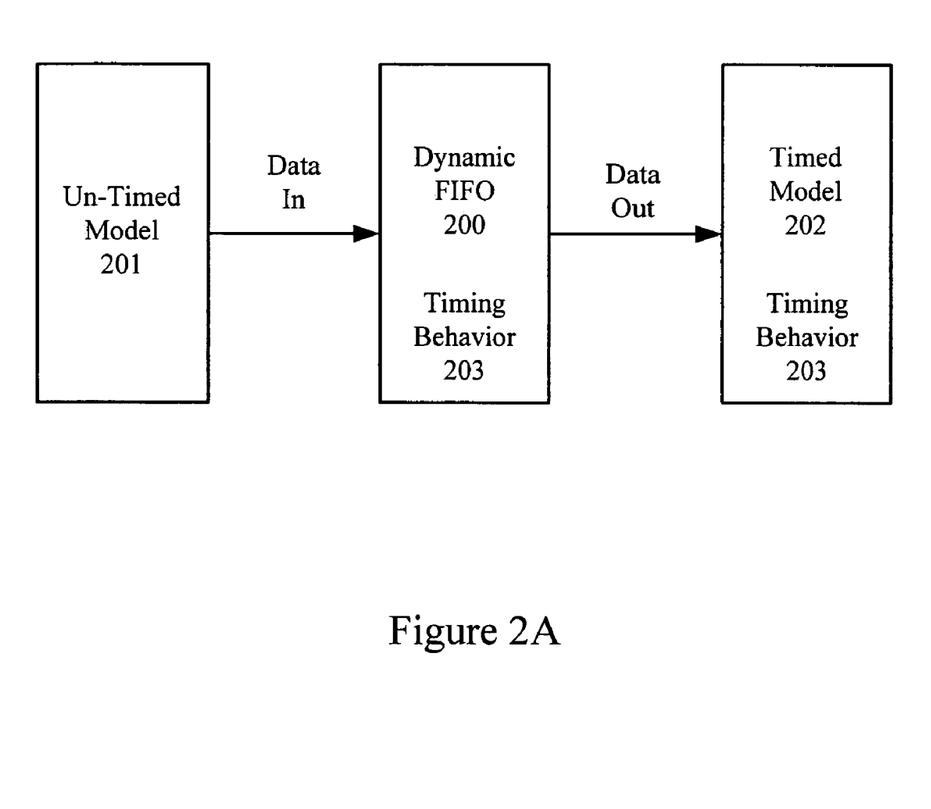
FIG. 2A illustrates a simplified representation of a dynamic FIFO that can be used as an interface between models, wherein the dynamic FIFO and the destination model have substantially similar timing behaviors.

FIG. 2A illustrates a simplified representation of a dynamic FIFO 200 that can be used as an interface between an un-timed model 201 and a timed model 202. In this representation, dynamic FIFO 200 receives tokens generated by un-timed model 201 (i.e. data in) and provides tokens to be consumed by timed model 202 (i.e. data out). Of importance, dynamic FIFO 200 has a timed behavior 203 that is compatible with that of timed model 202. Note that timed behavior 203 could refer to an identical clock signal, wait statements with similar time constants, or other substantially similar timed behavior.

Figure 2B:
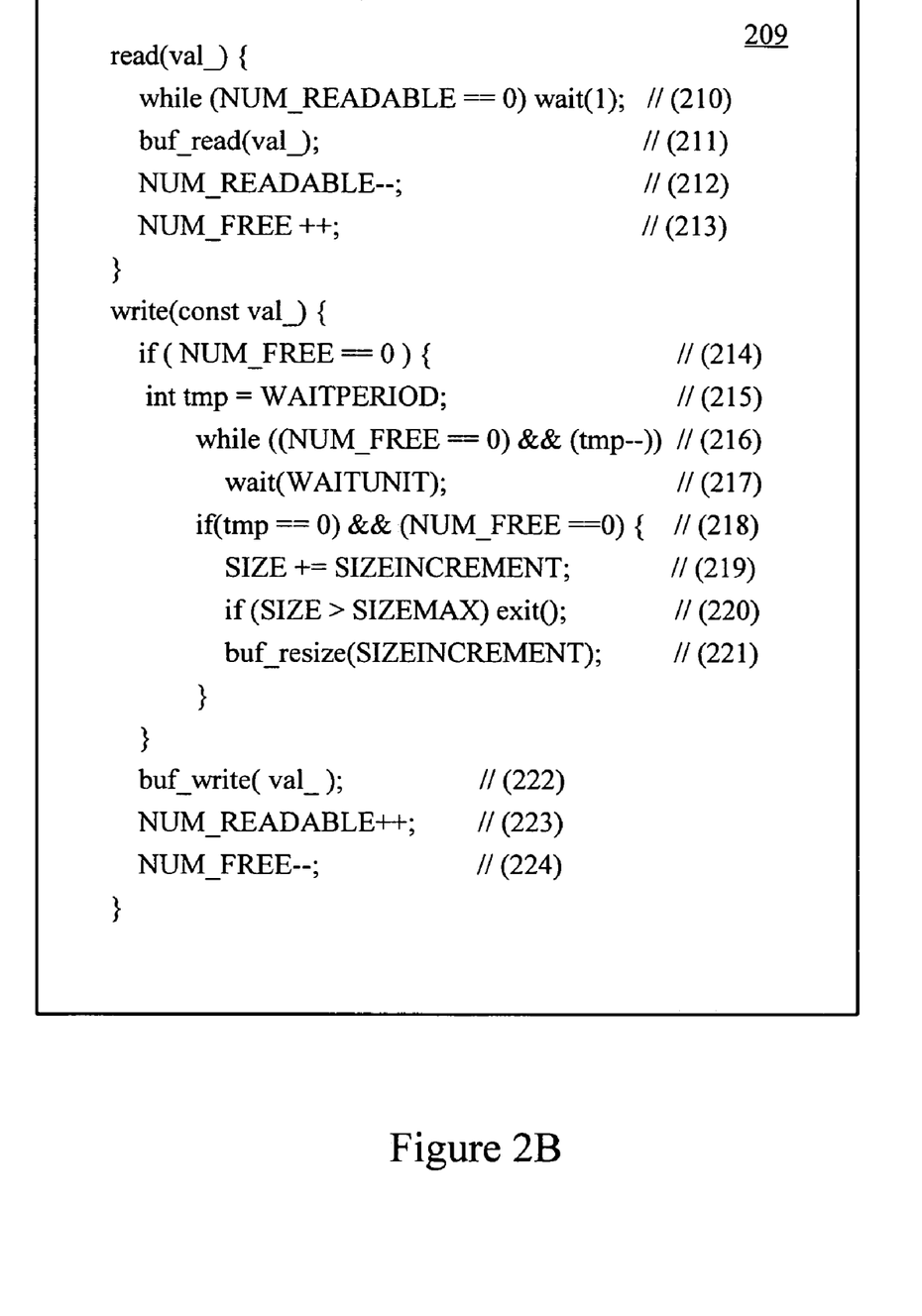
FIG. 2B illustrates exemplary pseudo code that describes the operation of the dynamic FIFO shown in FIG. 2A.

FIG. 2B illustrates exemplary pseudo code 209 that describes the operation of dynamic FIFO 200 during a read function and a write function. Note that in other embodiments, the read and write functions can be collapsed into one function or separated into several auxiliary functions.

Dynamic FIFO 200 can include a plurality of adjustable parameters. For example, in one embodiment, a user could adjust the following parameters initially set to default values.

SIZEMAX: a maximum allowable size for the dynamic FIFO (default value of 1024*1024). By using this parameter, if a real deadlock exists in the design, the simulation will be suspended.

SIZE: an original size of the dynamic FIFO (default value of 16). The value of the SIZE parameter at the end of simulation provides a good approximation of the value that must be used in implementation.

SIZEINCREMENT: a value that will be used to adjust the size of the dynamic FIFO if an increase of the storage is needed (default value of 2).

WAITUNIT: a time resolution required for the dynamic FIFO (default value of 1 nanosecond). In some cases, the WAITUNIT parameter can be correlated with the time granularity of the simulation kernel.

WAITPERIOD: an integer number of time units that the dynamic FIFO will wait before increasing its size (default value of 16).

In one embodiment, dynamic FIFO 200 can use the following internal variables for the storage of tokens.

BUF: a data structure used for storage. This data structure can use various implementations, e.g. circular lists, stacks, or vectors. The data structure size is given by the parameter size.

NUM_FREE: a counter of available free spaces in data structure BUF. As the FIFO is empty in the beginning, NUM_FREE will initially equal the SIZE of the FIFO.

NUM_READABLE: a counter of cells in data structure BUF that contains tokens available for reading (default value of 0). The following relation is true: NUM_FREE+ NUM_READABLE=SIZE.

Referring to pseudo code 209, in a read function, code 210 simply waits until a token is available in storage. When the token becomes available, code 211 delivers the token to the reader, code 212 adjusts the variable that counts the number of available tokens (which is decremented by 1), and code 213 adjusts the variable that counts the free spaces (which is incremented by 1). Note that if the condition in code 210 is not satisfied for a period that exceeds a given timeout, then the simulated system may not behave as desired. That is, in this case it is likely that the design contains a real deadlock in which the destination model waits for a token that will never be produced.

In a write function, code 214 checks if there is any space available to store the new token. If no space is available, then code 215 initializes a counter for a constant wait period, and code 216 and 217 execute the waiting till either the period is finished or space has been made available by a read call. Code 218 determines if the wait period has been exhausted without creating new space. If so, code 219 will increment the size of the buffer storage. If this size exceeds a parameter set by the user, then code 220 exits the simulation. This is, in this case, it is likely that a real deadlock exists in which the source model creates tokens that will never be consumed by the destination model. Otherwise, code 221 re-sizes the buffer, thereby creating new available space in which code 222 can insert the new token. Finally, code 223 and 224 adjust the internal variables that count the number of available tokens and free spaces.

Thus, dynamic FIFO 200 can automatically increase memory allocation. In this manner, the possibility of causing a deadlock when running the simulation of models 201 and 202 is eliminated. Note that because memory is one of the most expensive resources during simulation, the initial buffer size as well as increments could be set relatively small, thereby reducing the possibility of over-sizing the buffer.

Moreover, setting a small initial buffer size and small increment size can optimize the size of the physical FIFO when implementing the design in silicon. Specifically, in accordance with one feature of the invention, the final simulated buffer size can substantially correspond to the size of the physical buffer that should be implemented in silicon or software (assuming that the test vectors used in the simulation are comprehensive and accurate). Therefore, limiting the buffer size of the dynamic FIFO in simulation can also optimize the physical size of the FIFO to be implemented in silicon. In one embodiment, the maximum size of the dynamic FIFO can be limited by some value set either by the user or the simulator.

Pseudo code 209 can quickly optimize the size of the buffer in the dynamic FIFO, particularly if the dynamic FIFO and destination model have substantially similar timing behavior. In some designs where the dynamic FIFO and the destination model have dramatically different timing behavior, the dynamic FIFO can advantageously adjust its buffer size as well as its wait period to reach an acceptable balance between buffer size and delay.

Figure 3A:
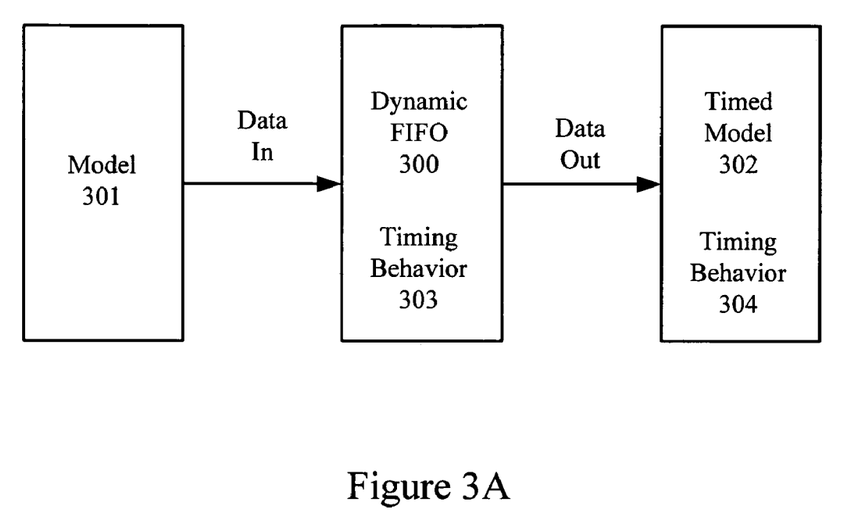
FIG. 3A illustrates a simplified representation of a dynamic FIFO that can be used as an interface between models, wherein the dynamic FIFO and the destination model have different timing behaviors.

For example, FIG. 3A illustrates a simplified representation of a dynamic FIFO 300 that can be used as an interface between a model 301 and a timed model 302. In this representation, dynamic FIFO 300 receives tokens generated by model 301 (i.e. data in) and provides tokens to be consumed by timed model 302 (i.e. data out). Of importance, dynamic FIFO 300 has a first timing behavior (e.g. wait period) 303 whereas timed model 302 has a second timing behavior (e.g. wait period) 304. Note that model 301 could be a timed model or an un-timed model.

If wait period 303 of FIFO 300 is much smaller than wait period 304 of model 302, then dual adjustments may be desirable to optimize dynamic FIFO 300. For example, if only buffer size adjustments could be made to dynamic FIFO 300, the period used to make an adjustment of the buffer is one nanosecond, and model 302 executes only every one million nanoseconds, then dynamic FIFO 300 could quickly reach a commercially unviable size. Therefore, in accordance with one embodiment of the invention, the wait period of the dynamic FIFO can be adjusted in addition to its buffer size.

Figure 3B:
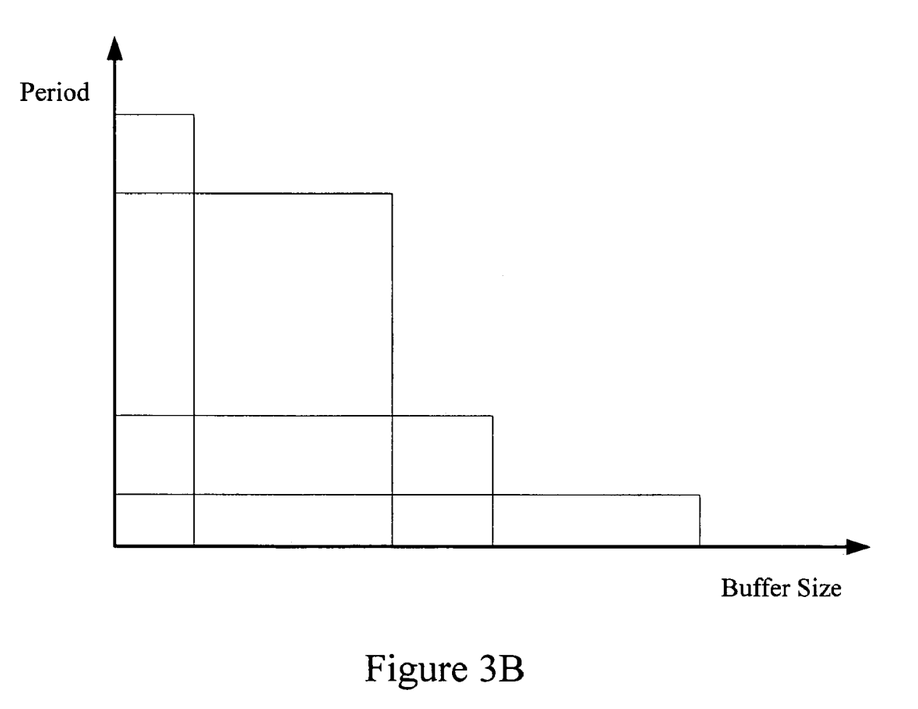
FIG. 3B illustrates possible settings for the buffer size and the waiting period of the dynamic FIFO of FIG. 3A.

FIG. 3B illustrates various possible settings for buffer size and waiting period. The goal of this dual adjustment is to balance the buffer size as well as the wait period. In other words, having an intermediate buffer size and an intermediate wait period may be commercially more acceptable than an extremely large buffer size and a short wait period (or an extremely long wait period and a very small buffer size). In one embodiment, the buffer size and the wait period can be alternately adjusted.

Figure 3C:
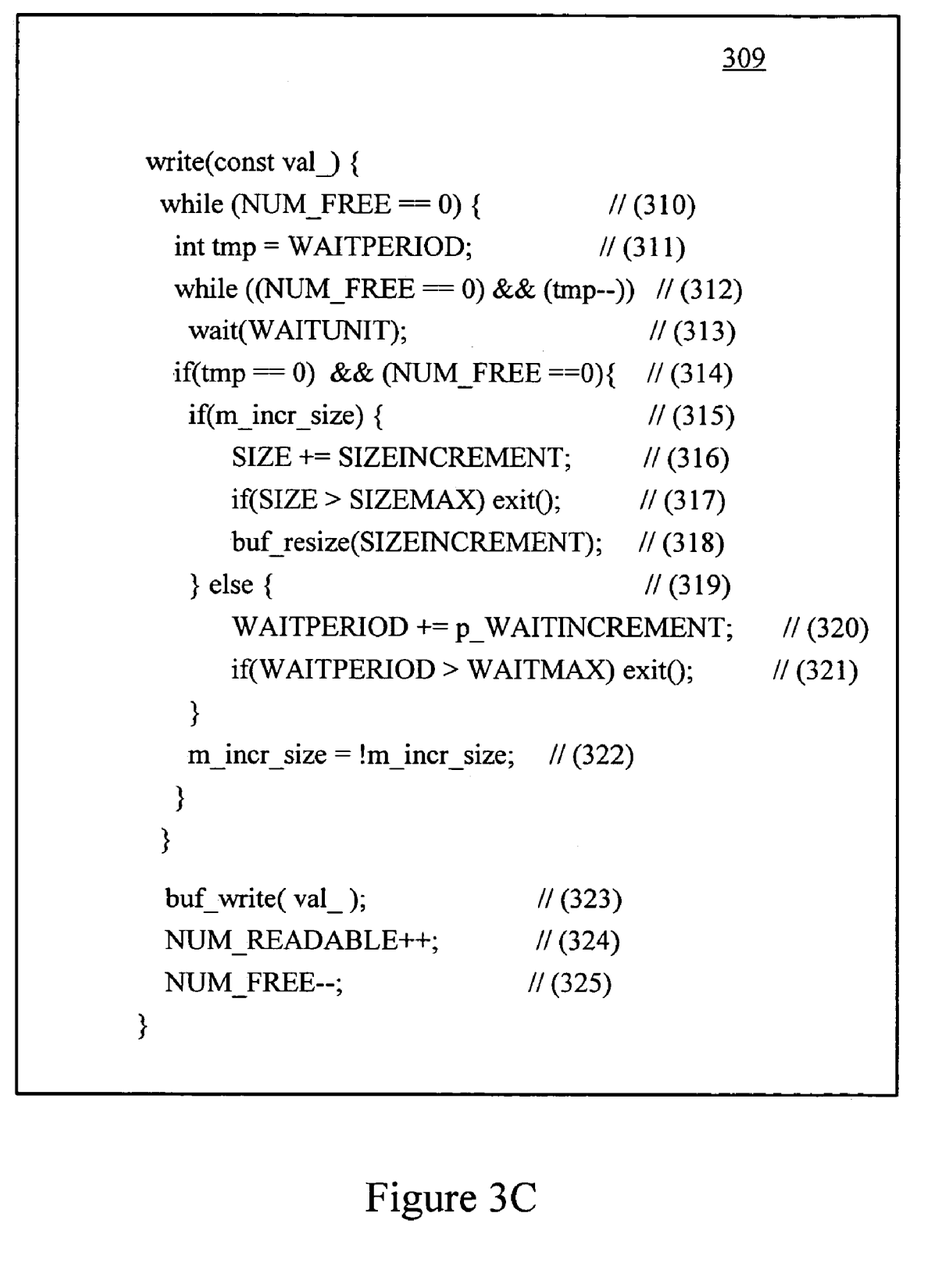
FIG. 3C illustrates exemplary pseudo code that describes the operation of the dynamic FIFO shown in FIG. 3A.

FIG. 3C illustrates pseudo code 310 that describes the write operation of dynamic FIFO 300. In addition to the parameters described for dynamic FIFO 200 (FIG. 2), FIFO 300 uses the following parameters:

WAITPERIOD: the period that dynamic FIFO 300 will wait before proceeding to an adjustment of its storage size. Unlike dynamic FIFO 200, in dynamic FIFO 300 this period may change during simulation (default value of 16).

WAITINCREMENT: the increment value that will be used to augment the WAITPERIOD, if necessary (default value of 2).

WAITMAX: the maximum allowable period. If this value is reached, then a real deadlock exists (default value of 1024).

Dynamic FIFO 300 also uses an internal variable INCR_SIZE that will determine if it should adjust its size or its wait period.

In one embodiment, the read function of dynamic FIFO 300 is identical to that described for dynamic FIFO 200 (see FIG. 2B, code 210-213). FIG. 3C illustrates exemplary pseudo code 309 that describes the operation of dynamic FIFO 300 during a write function. In the write function, code 310 checks if any space is available to store a new token. If not, then code 311, 312, and 313 can use a counter to wait before attempting to adjust the parameters of dynamic FIFO 300. Code 314 determines whether the wait period has been exhausted. Code 315 checks if dynamic FIFO 300 should adjust the size of its buffer or its WAITPERIOD. Code 316, 317, and 318 adjust the size of the buffer.

Of importance, code 319, 320, and 321 can perform an adjustment of the wait period. In this embodiment, code 322 ensures that adjustments of size and wait periods occur alternatively. Code 323, 324, and 325 write the new value and adjust the internal variables that count the number of available tokens and free spaces.

Figure 4:
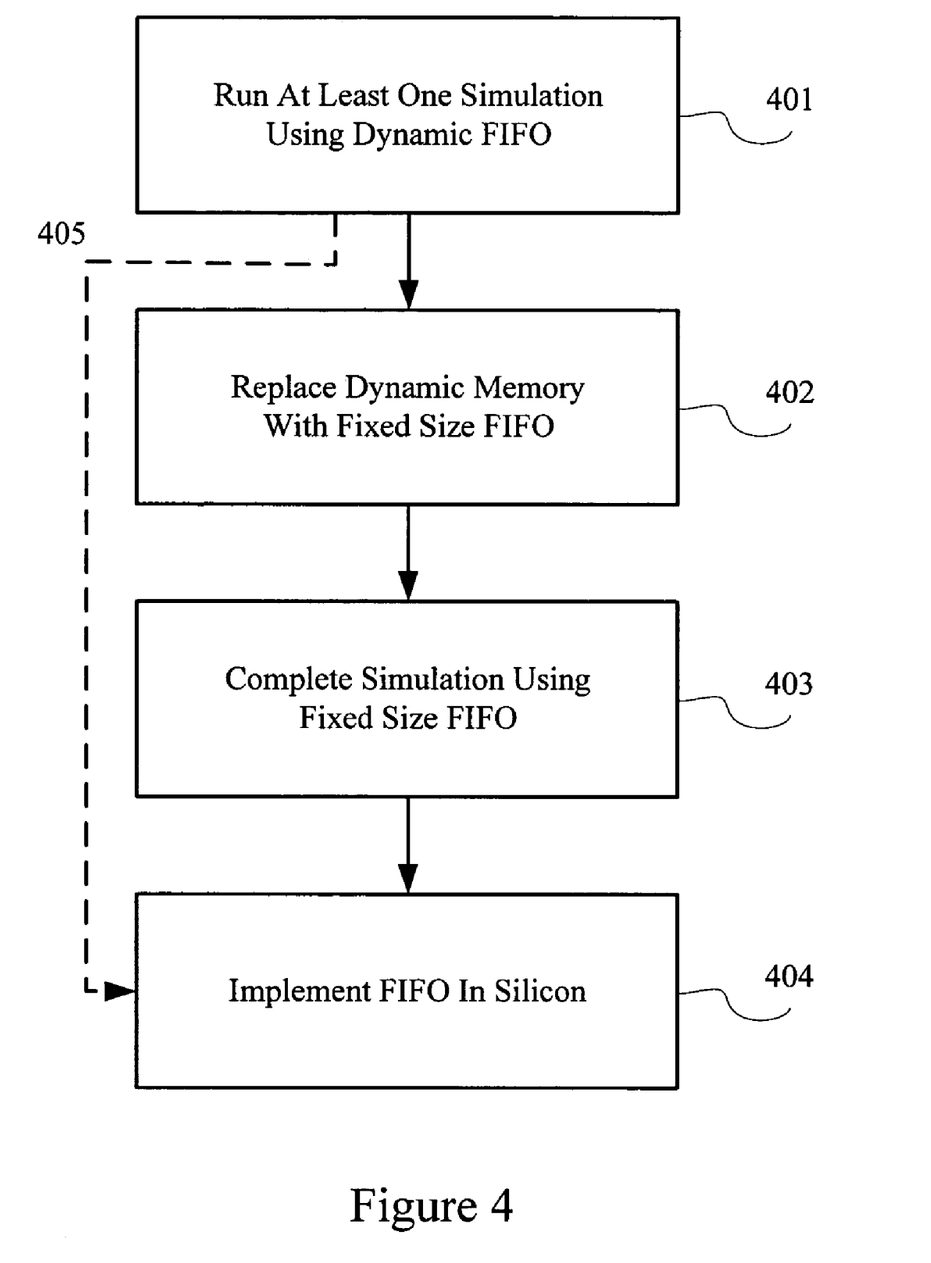
FIG. 4 illustrates implementation of a FIFO in silicon based on simulations using the dynamic FIFO or a combination of the dynamic FIFO and a fixed size FIFO.

In accordance with one feature of the invention and referring to FIG. 4, after running at least one simulation with a dynamic FIFO (step 401), the user can replace the dynamic FIFO with a fixed size FIFO (step 402). Of importance, the previous simulation(s) with the dynamic FIFO can determine that fixed size. In this manner, subsequent simulations with the fixed size FIFO can quickly run with no or minimal blockages. After the completion of simulation (step 403), the fixed size FIFO can be implemented in silicon or software (step 404). Note that dashed arrow 405 indicates that in other embodiments, simulation(s) can be performed using only the dynamic FIFO.

Advantageously, the dynamic FIFO can provide an interface between models specified in different execution domains, e.g. SLD, RTL, or gate level. Exemplary tools for simulating in these domains include, but are not limited to, for example, the System Studio tool from Synopsys, Inc. at the SLD level, the VCS™ and VCS MX tools from Synopsys, Inc. at the RTL and gate level, and the Star-SimXT™ and Star-HSPICE™ tools from Synopsys, Inc. at the cell and transistor level.

Moreover, the dynamic FIFO can provide an interface between models described using different specification languages. For example, one model could be specified using data flow graph (DFG) or finite state machine (FSM) at the SLD level, another model could be specified using SystemC, C++, C, System Verilog, Verilog, or VHDL at the RTL, behavioral, or transaction level, and yet another model could be specified using Verilog, VHDL, or as a netlist at the gate level. In one embodiment, the dynamic FIFO can be specified using any standard specification language, such as C++, Verilog, VHDL, SystemVerilog, SystemC, C etc.

Although illustrative embodiments of the invention have been described in detail herein with reference to the figures, it is to be understood that the invention is not limited to those precise embodiments. They are not intended to be exhaustive or to limit the invention to the precise forms disclosed. As such, many modifications and variations will be apparent.

For example, although system level, RTL, and gate level execution domains are described herein, the dynamic FIFO can be used to interface between models of other execution domains. These execution domains could include, but are not limited to, un-timed functional, transactional, behavioral, etc. Thus, the dynamic FIFO allows users to smoothly integrate various simulation engines and provides an integrated verification platform.

Accordingly, it is intended that the scope of the invention be defined by the following claims and their equivalents.

The invention claimed is:

1. A simulation environment with a time component, the simulation environment comprising:
    a first unit that produces data;
    a second unit for consuming the data; and
    a dynamic first-in first-out buffer (FIFO) that interfaces between the first unit and the second unit, the dynamic FIFO capable of automatically increasing its size based on a configurable wait period to eliminate deadlock, wherein the dynamic FIFO determines whether a wait period has expired before increasing its size, and wherein an optimized size of the dynamic FIFO in the simulation environment determines an optimized FIFO memory size for a silicon implementation.

2. The simulation environment of claim 1, wherein the dynamic FIFO is further capable of automatically increasing the wait period if its size is increased a predetermined number of times.

3. The simulation environment of claim 1, wherein the dynamic FIFO has a timing behavior substantially similar to that of the second unit.

4. The simulation environment of claim 1, wherein the dynamic FIFO has a different timing behavior than that of the second unit.

5. A tool used in a simulation environment, the simulation environment including a first unit that produces data and a second unit for consuming the data, the tool comprising:
    a dynamic first-in first-out buffer (FIFO) that interfaces between the first unit and the second unit, the dynamic FIFO capable of automatically increasing its size based on a configurable wait period to eliminate deadlock between the first and second units, wherein the dynamic FIFO determines whether a wait period has expired before increasing its size, and wherein an optimized size of the dynamic FIFO in the simulation environment determines an optimized FIFO memory size for a silicon implementation.

6. The tool of claim 5, wherein the dynamic FIFO is further capable of automatically increasing the wait period if its size is increased a predetermined number of times.

7. The tool of claim 5, wherein the dynamic FIFO has a timing behavior different than that of the second unit.

8. A method of decreasing simulation time for a design, the simulation including a first model and a second model, the first model representing a first block of the design that generates a plurality of tokens, the second model representing a second block of the design that consumes the plurality of tokens based on a behavior, the method comprising:
    providing a dynamic memory for receiving the tokens, storing the tokens, and providing the tokens in an order output by the first model when requested by the second model;
    setting a wait period of the dynamic memory, wherein the wait period is defined by a predetermined number of cycles associated with the behavior;
    decreasing the wait period each time the dynamic memory is full and the second model does not request a token; and
    automatically increasing a size of the dynamic memory by an increment when the wait period is zero,
    wherein decreasing the wait period and increasing the size, as needed, optimize the size and wait period of the dynamic memory, wherein an optimized size and wait period of the dynamic memory provides an actual memory size and wait period for a silicon implementation of the design.

9. The method of claim 8, further including resetting the wait period after increasing the size of the dynamic memory.

10. The method of claim 8, wherein the dynamic memory includes a first-in first-out buffer (FIFO).

11. The method of claim 8, further including setting a maximum size of the dynamic memory.

12. The method of claim 8, further including increasing a counter value each time the size of the memory increases.

13. The method of claim 12, further including automatically increasing the predetermined number of time units defining the wait period if the counter value exceeds a limit.

14. The method of claim 13, further including setting a maximum wait period for the dynamic memory.

15. The method of claim 13, wherein automatically increasing the size of the dynamic memory and automatically increasing the predetermined number of time units defining the wait period are alternately performed.

16. A dynamic memory usable in a simulation environment, the dynamic memory providing an interface between a first model and a second model, the first model generating a plurality of tokens, the second model consuming the plurality of tokens based on a behavior, the dynamic memory device comprising:

means for handling the tokens including receiving the tokens, storing the tokens, and providing the tokens in an order output by the first model when requested by the second model, means for setting a wait period of the dynamic memory device, wherein the wait period is defined by a predetermined number of time units associated with the behavior;

means for decreasing the wait period each time the dynamic memory is full and the second model does not request a token; and means for increasing a size of the means for storing the tokens by an increment if the wait period is zero, wherein an optimized combination of size and wait period of the means for storing the tokens provides an actual memory size and wait period for a silicon implementation.

17. The dynamic memory of claim 16, further including means for resetting the wait period after increasing the size of the dynamic memory.

18. The dynamic memory of claim 16, wherein the means for handling the tokens is implementable with a first-in first-out buffer (FIFO).

19. The dynamic memory of claim 16, further including means for setting a maximum size of the dynamic memory.

20. The dynamic memory of claim 16, further including means for increasing a counter value each time the size of the dynamic memory increases.

21. The dynamic memory of claim 20, further including means for increasing the predetermined number of cycles defining the wait period if the counter value exceeds a limit.

22. The dynamic memory of claim 21, further including means for setting a maximum wait period for the dynamic memory.

23. The dynamic memory of claim 22, further including means for alternately increasing the size of the dynamic memory and increasing the predetermined number of cycles defining the wait period.

24. A simulation environment with a time component, the simulation environment comprising:

a first unit that produces data;
a second unit for consuming the data;
a dynamic first-in first-out buffer (FIFO) that interfaces between the first unit and the second unit,
the dynamic FIFO capable of automatically increasing its size based on a configurable wait period to eliminate deadlock between the first and second units, thereby determining an optimized size of the dynamic FIFO,
the dynamic FIFO determining whether a wait period has expired before increasing its size, and
the dynamic FIFO including an output unit that provides the optimized size to a simulator to reduce simulation time of the first and second units.

25. The simulation environment of claim 24, wherein the dynamic FIFO is further capable of automatically increasing the wait period if its size is increased a predetermined number of times.

26. The simulation environment of claim 24, wherein the dynamic FIFO has a timing behavior substantially similar to that of the second unit.

27. The simulation environment of claim 24, wherein the dynamic FIFO has a different timing behavior than that of the second unit.

28. A tool used in a simulation environment, the simulation environment including a first unit that produces data and a second unit for consuming the data, the tool comprising:

a dynamic first-in first-out buffer (FIFO) that interfaces between the first unit and the second unit,
the dynamic FIFO capable of automatically increasing its size based on a configurable wait period to eliminate deadlock between the first and second units, thereby determining an optimized size of the dynamic FIFO,
the dynamic FIFO determining whether a wait period has expired before increasing its size, and
the dynamic FIFO including an output interface that provides the optimized size to a simulator to reduce simulation time of the first and second units.

29. The tool of claim 28, wherein the dynamic FIFO is further capable of automatically increasing the wait period if its size is increased a predetermined number of times.

30. The tool of claim 28, wherein the dynamic FIFO has a timing behavior different than that of the second unit.

31. A method of decreasing simulation time for a design, the simulation including a first model and a second model, the first model representing a first block of the design that generates a plurality of tokens, the second model representing a second block of the design that consumes the plurality of tokens based on a behavior, the method comprising:

providing a dynamic memory for receiving the tokens, storing the tokens, and providing the tokens in an order output by the first model when requested by the second model;

setting a wait period of the dynamic memory, wherein the wait period is defined by a predetermined number of cycles associated with the behavior;

decreasing the wait period each time the dynamic memory is full and the second model does not request a token;

increasing a size of the dynamic memory by an increment when the wait period is zero; and based on decreasing the wait period and increasing the size, automatically determining an optimized wait period and size and providing the optimized wait period and size to a simulator to minimize simulation time of the first and second models.

32. The method of claim 31, further including resetting the wait period after increasing the size of the dynamic memory.

33. The method of claim 31, wherein the dynamic memory includes a first-in first-out buffer (FIFO).

34. The method of claim 31, further including setting a maximum size of the dynamic memory.

35. The method of claim 31, further including increasing a counter value each time the size of the memory increases.

36. The method of claim 35, further including automatically increasing the predetermined number of time units defining the wait period if the counter value exceeds a limit.

37. The method of claim 35, further including setting a maximum wait period for the dynamic memory.

38. The method of claim 35, wherein automatically increasing the size of the dynamic memory and automatically increasing the predetermined number of time units defining the wait period are alternately performed.

39. A dynamic memory usable in a simulation environment, the dynamic memory providing an interface between a first model and a second model, the first model generating a plurality of tokens, the second model consuming the plurality of tokens based on a behavior, the dynamic memory device comprising:

means for handling the tokens including receiving the tokens, storing the tokens, and providing the tokens in an order output by the first model when requested by the second model, means for setting a wait period of the dynamic memory device, wherein the wait period is defined by a predetermined number of time units associated with the behavior;

means for decreasing the wait period each time the dynamic memory is full and the second model does not request a token;

means for increasing a size of the means for storing the tokens by an increment if the wait period is zero; and means for outputting that receive outputs of the means for decreasing the wait period and the means for increasing the size, the means for outputting automatically determining an optimized combination of size and wait period of the means for storing the tokens, the means for outputting providing the optimized combination to a simulator, thereby minimizing simulation time of the first and second models.

40. The dynamic memory of claim 39, further including means for resetting the wait period after increasing the size of the dynamic memory.

41. The dynamic memory of claim 39, wherein the means for handling the tokens is implementable with a first-in first-out buffer (FIFO).

42. The dynamic memory of claim 39, further including means for setting a maximum size of the dynamic memory.

43. The dynamic memory of claim 39, further including means for increasing a counter value each time the size of the dynamic memory increases.

44. The dynamic memory of claim 43, further including means for increasing the predetermined number of cycles defining the wait period if the counter value exceeds a limit.

45. The dynamic memory of claim 44, further including means for setting a maximum wait period for the dynamic memory.

46. The dynamic memory of claim 45, further including means for alternately increasing the size of the dynamic memory and increasing the predetermined number of cycles defining the wait period.

* * * * *